United States Patent [19]

Martinell

[11] Patent Number: 5,133,461
[45] Date of Patent: Jul. 28, 1992

[54] FREESTANDING PORTABLE BICYCLE STAND

[75] Inventor: Steven W. Martinell, Vancouver, Wash.

[73] Assignee: Racor, Inc., Vancouver, Wash.

[21] Appl. No.: 695,992

[22] Filed: May 6, 1991

Related U.S. Application Data

[63] Continuation-in-part of Ser. No. 652,910, Feb. 8, 1991.

[51] Int. Cl.⁵ .............................................. A47F 7/00
[52] U.S. Cl. .......................................... 211/21; 211/22; 211/198
[58] Field of Search ...................... 211/22, 21, 20, 198

[56] References Cited

U.S. PATENT DOCUMENTS

| | | | |
|---|---|---|---|
| 619,775 | 2/1899 | Murray | 211/21 |
| 649,402 | 5/1900 | Clark | 211/21 |
| 3,202,289 | 8/1965 | Burditt | 211/22 |
| 3,355,028 | 11/1967 | Mork | 211/21 |
| 3,455,461 | 7/1969 | Kesling | 211/21 |
| 3,785,500 | 1/1974 | Kennelly | 211/21 X |

*Primary Examiner*—Robert W. Gibson, Jr.
*Attorney, Agent, or Firm*—Chernoff, Vilhauer, McClung & Stenzel

[57] ABSTRACT

A lightweight, freestanding bicycle stand of sturdy construction composed of a plurality of substantially identical modular units. Each modular unit has at least one rectangular-shaped wheel receptacle and the units are releasably joined together by a common threaded tension member and associated threaded locking members. The modularity permits cost-effective manufacturing and has the added advantage of allowing users to customize modules to create a bicycle stand having a capacity for any number of bicycles desired. In addition, because the modular units are joined together by a common threaded tension member, upon loosening the locking members the modules may be rotated about the common axis defined by the tension member into a substantially flat configuration, thereby permitting easy stacking, transportation and storage.

10 Claims, 4 Drawing Sheets

FREESTANDING PORTABLE BICYCLE STAND

CROSS-REFERENCE TO RELATED APPLICATION

This application is a continuation-in-part of patent application Ser. No. 07/652,910, filed Feb. 8, 1991.

FIELD OF THE INVENTION

The present invention relates to a freestanding, portable stand for holding a bicycle upright and retaining it against movement by securing one of its wheels in a stationary, upright position.

BACKGROUND OF THE INVENTION

As is well known to every schoolchild, there are many designs of stands or racks for supporting a bicycle upright. Among the various bike stands are those designed to receive a wheel of the bicycle and maintain the wheel in an upright, stationary position, thereby supporting the bicycle upright as well. Typically, these prior art stands are mounted to ground footings for stability, and are fairly large, heavy assemblies with their structural elements permanently connected so that they cannot readily be compacted for storage and transport. Furthermore, the traditional bicycle rack comes in a fixed length, without the capability for increasing its capacity for more bicycles.

The conventional bicycle stand presents many problems for those who desire a stand that is portable. A frequent application in which portable bicycle stands are desired is at sporting events, such as bicycle races, or other special events where spectators or participants arrive on bicycles. The need for portable bicycle racks is particularly important at triathlons because the event requires a bicycle staging area where contestants leave their bicycle during the swimming and running legs. For these purposes it is important that the bicycle racks be lightweight, easy to set up and take down, and conveniently storable. It is also advantageous to have a bicycle rack whose length can be customized to fit optimally within any particular staging area for one event. Currently, there is no known design of rack on the market suitable for setting up a staging area to receive and properly store a large number of bicycles in a cost effective and convenient manner. In addition, because of the expense, bulkiness and weight of traditional bicycle stands, bike stands of the type that maintain the bicycle upright have typically not found wide usage in household applications.

SUMMARY OF THE INVENTION

The present invention overcomes the aforementioned deficiencies of conventional stands by providing an easy-to-use, lightweight, stable bicycle stand composed of modular components that can be fitted together to form a bicycle rack of any desired length. In addition, the bicycle stand of the present invention is of simple design that is relatively inexpensive to manufacture, being of light metal and largely of standard tubular components, and it meets the needs for sporting and other special events by providing a stand design that is portable, readily set up and easily stored. Furthermore, as previously stated, the stand can be readily ganged into customized lengths suitable for any staging area. In addition, because of the innovative design of the present invention, the stand may be made from relatively lightweight tubular components, thereby providing an inexpensive yet sturdy bicycle rack or stand that is suitable for residential use.

One of the principal objectives of the present invention is, therefore, to provide a portable, lightweight but sturdy, freestanding, modular-designed bicycle stand which may be readily set up, taken down and efficiently stored.

Another objective is to provide a bicycle stand which is economical to manufacture and assemble.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
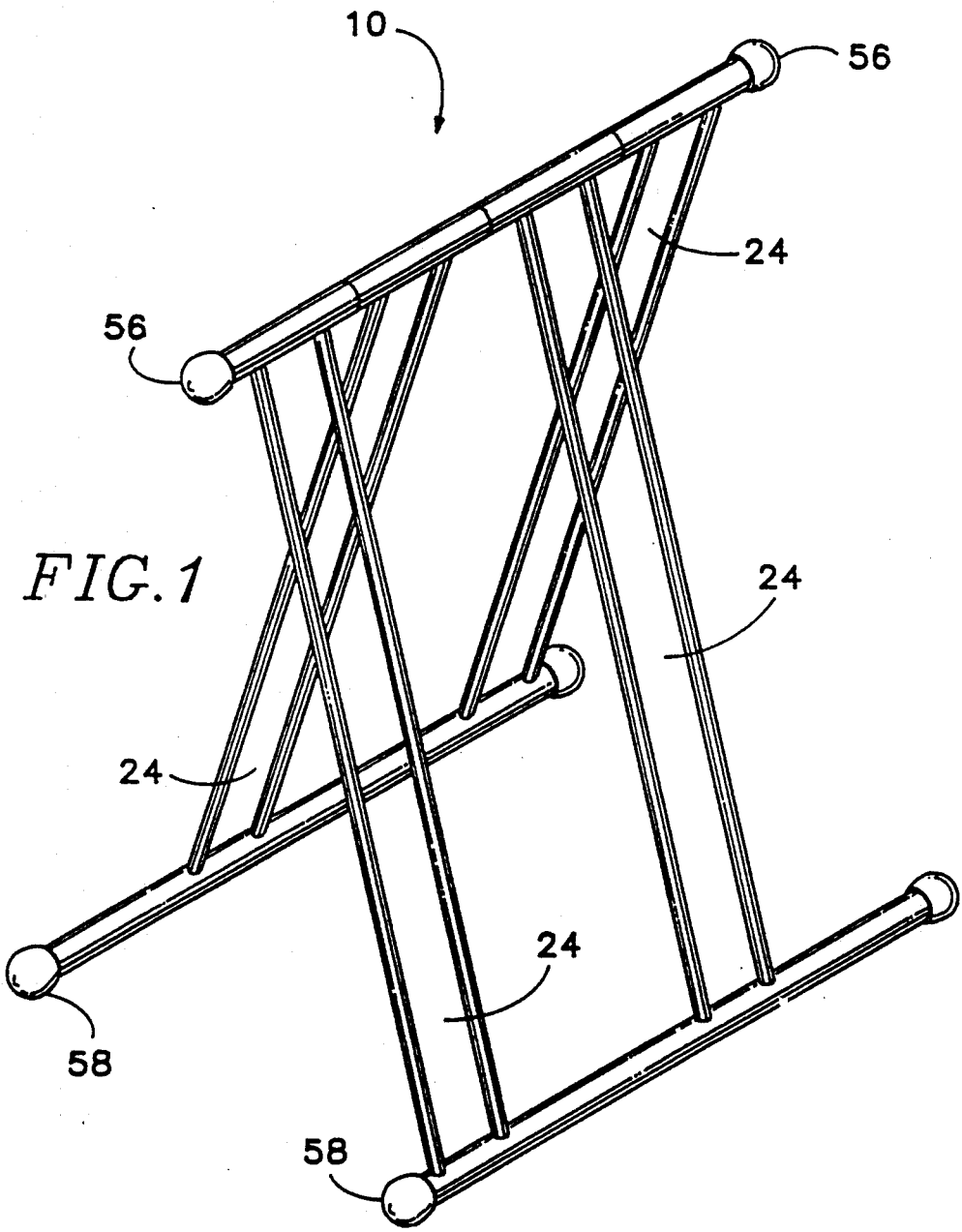
FIG. 1 is a perspective view of an exemplary embodiment of a bicycle stand according to the present invention.
Figure 2:
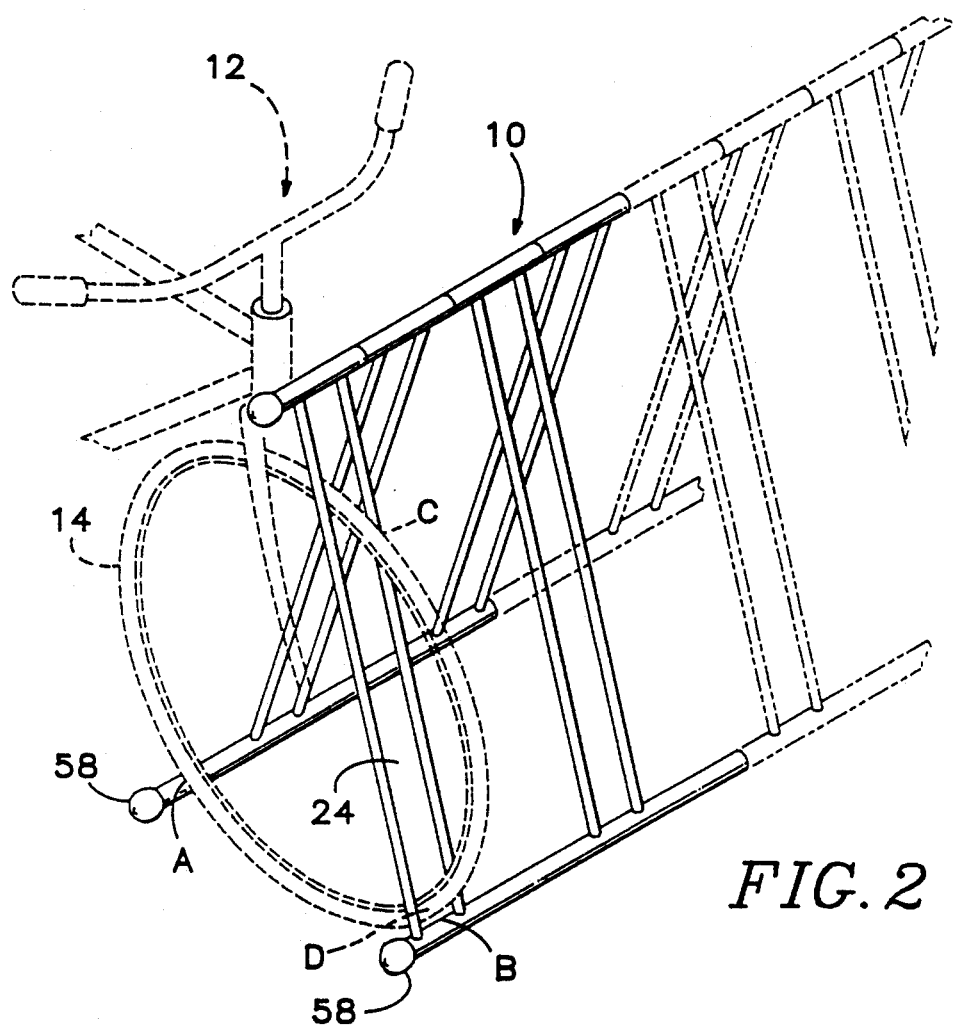
FIG. 2 shows the bicycle stand in a perspective view supporting a bicycle upright and further showing the stand ganged together with another unit to provide increased capacity.
Figure 3:
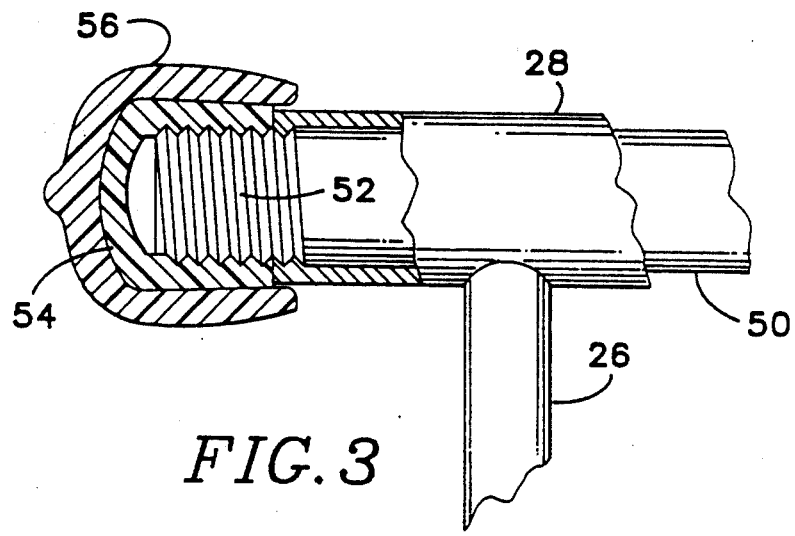
FIG. 3 is a partial cross-sectional view of an end cap and joining means for connecting together the modules of the bicycle stand.

An exemplary embodiment of the present invention is shown in FIG. 1 as a freestanding stand 10 designed to support upright and hold stationary the wheel of a bicycle that is inserted into a wheel receptacle 24. FIG. 2 shows the stand 10 supporting a bicycle 12 in such manner. Optimally, the bicycle wheel will contact the stand 10 at points A and B to prevent the wheel from rolling forward or backward and, additionally, the stand will contact the wheel along lines C and D to support the wheel upright. (The wheel receptacle will contact either the left or right side of the wheel depending on which direction the bicycle leans.) FIG. 2 also shows two of the units 10 ganged together to create a longer stand with increased capacity for more bicycles.

Figure 4:
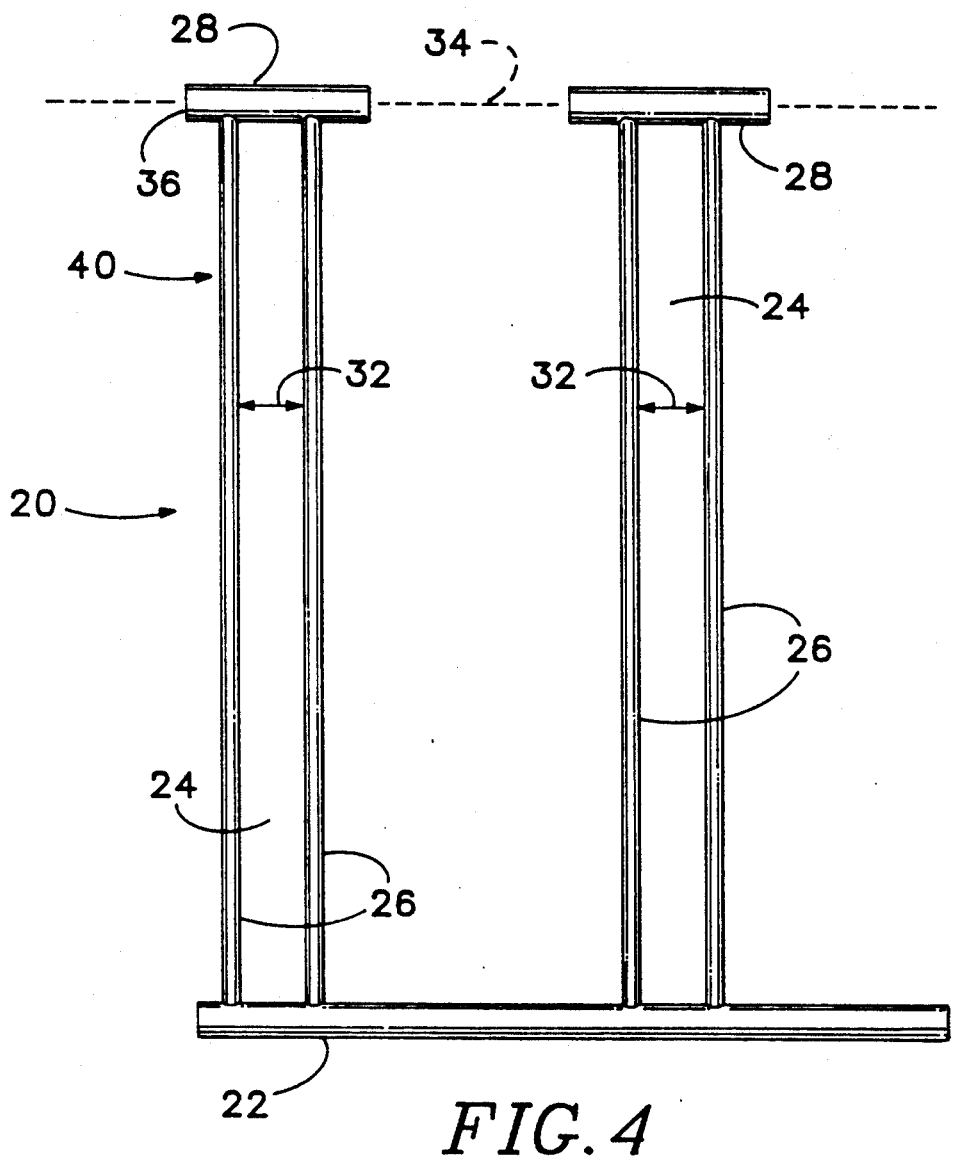
FIG. 4 is a front elevational view of the bicycle stand embodiment of FIG. 1.

The exemplary embodiment of the stand 10 shown in FIGS. 1-4 utilizes at least two substantially identical modules. FIG. 4 illustrates a single module 20 which comprises a base tube 22, a wheel receptacle 24 having upright posts 26, and a tube segment 28. In the configuration shown, the stand has two wheel receptacles 24—a design which is particularly suitable for household use. However, a stand module could have a greater or fewer number of wheel receptacles. A module with only a single wheel receptacle would typically comprise four tubes; i.e., a base tube, two upright posts and a tube segment. This minimum configuration of the stand is best exemplified in FIG. 5 wherein each module has only a single wheel receptacle. (A stand module with more than one wheel receptacle would still require but a single base tube, but the combination of upright posts and tube segment would be repeated.)

Returning to the description of the stand configuration shown in FIG. 4, the base tube 22 is an elongate round member and, preferably, is tubular to provide maximum rigidity, both torsional and longitudinally, at a minimum weight. The ends of the base tube are preferably covered with end caps 58 to protect the floor or other surface on which it rests from being scratched.

The wheel receptacle 24 is an elongate opening defined by two upright posts 26, the base tube 22, and the tube segment 28. The upright posts 26 are elongate tubes that are fixedly, perpendicularly attached, as by welding, to the base tube 22. The tube segment 28 is fixedly attached to the tops of the posts 26. As shown, the posts are made of a tubular material having a smaller diameter than either the tube segment 28 or the base tube 22. Preferably, the posts are substantially parallel and spaced apart by a distance 32 that is sufficient to allow a bicycle wheel to loosely fit between the posts. It may be desirable to optimize the spaced-apart distance 32 depending on the bicycle market targeted. For example, racing bicycles designed for road use have substantially thinner tires than off-road bikes. Consequently, distance 32 may be more narrow on stands intended for roadracing bikes than for off-road bikes. The longitudinal length of the posts should be greater than the diameter of the bicycle wheels in order for the stand to hold and retain the bicycle securely therein.

There are three critical parameters for the tube segment 28: length, longitudinal alignment, and orientation along the length of the base tube.

The length of tube segments is dependent upon the length of the base tube and the number of wheel receptacles. Thus, where S = length of tube segment;
L = length of base tube; and
N = the number of wheel receptacles, the length of the tube segment may be expressed as $S = L/2N$. Therefore, in a module having one wheel receptacle, the tube segment's length will be exactly one-half of the base tube's length. By extrapolation, a module with three wheel receptacles will have tube segments that are one-sixth the length of the base tube, and so on. This relationship is critical to the ganging feature wherein more than two modules may be connected together.

The second critical parameter is the longitudinal alignment which requires that the tube segments be aligned to share a common longitudinal axis 34. This alignment is critical because modules are joined by aligning the tube segments end-to-end and inserting a tension member 50 through the center openings in all the tube segments. If one or more tube segments are misaligned it would be difficult to insert the tension member through all of the tube segments.

The third critical characteristic of the tube segment is its orientation with respect to the base tube. For purposes of discussion it is necessary to view two posts 26, and their associated tube segment 28, as a unit 40. This unit, which has a configuration similar to the Greek letter pi ("π"), forms three sides of the wheel receptacle 24 and will be referred to herein as the "π-unit." The π-units 40 are located along the longitudinal length of the base tube such that one π-unit is located near one end of the base tube, with the end 36 of its associated tube segment vertically aligned with the respective end of the base tube. The remaining π-units are located along the length of the base tube such that the distance between tube segments is equal to the length of one tube segment. This relationship permits joining two substantially identical modules together in a mirror image orientation.

The module 20 is the basic building block for the bicycle stand 10. It is possible to combine multiple modules to form stands having a capacity to hold as many bikes as is desired. However, a minimum number of two modules is necessary to form a freestanding bicycle stand. The method of joining the modules together to form a freestanding bicycle stand will now be described.

Two identical modules 20 are joined together, first by arranging the two modules upright in a mirror image orientation with their respective base tubes 22 on a flat horizontal surface and the tube segments 28 vertically aligned above their respective base tubes. Next, the modules are tilted toward each other until their respective tube segments 28 are interposed so as to be coincident along the common longitudinal axis 34. With the tube segments thus aligned, a tension member 50, with a threaded portion 52 at each end, is inserted in the longitudinal opening defined by the tube segments and fitted through all the tube segments. The tension member is centered in the series of tube segments so that a portion of the threaded end of the tension member extends from each end of the aligned series of tube segments. Thereafter, a cap nut 54 is screwed onto the threaded portion 52 of the tension member 50 until it comes into contact with a respective end of the tube segment 28. The cap nut 54 is preferably covered with a resilient hood 56 to provide a gripping surface so that the nut may be comfortably tightened by hand. A cap nut (with hood) is screwed onto both ends of the tension member 50 to keep it properly positioned relative to the tube segments 28 and to prevent the tension member from sliding out either end. Thereafter, the base tubes 22 associated with the respective modules 20 may be spread apart a suitable distance and placed upon a floor or other ground support surface. After the base tubes are sufficiently spaced apart, the hoods 56 are tightened at both ends of the tension member to compress the tube segments together and thereby frictionally maintain the stand in the spread-apart configuration as shown in FIG. 1. In this configuration the bicycle stand is adapted to fully receive a bicycle wheel in the wheel receptacle 24 and thereby support upright the associated bicycle.

A key feature of the present invention is its modularity which provides two significant advantages. First is the economical manufacturability of the bicycle stand. Because it is made up of identical modules the manufacturing process is greatly simplified. The manufacturer can mass produce large quantities of the modules and, through relatively simple automation, limit the man-hours expended in production.

The second significant advantage of the invention's modularity is that the unit may be ganged to create customized lengths of bicycle stands. This ganging feature is an advantage because it allows users to assemble a bicycle stand to suit their individual needs. In addition, the ganging feature means that the manufacturer need only produce and stock a minimum number of module configurations in order to meet the individual needs of a wide range of customers.

Additional stand modules 20 may be ganged together to form a longer bicycle rack having a greater capacity. This is accomplished by properly aligning the requisite number of modules and replacing the tension member 50 with a longer tension member. Thus, additional modules 20 may be arranged as shown in FIG. 2 and joined by a threaded tension member 50 of suitable length to create a bicycle stand having the capacity for any number of bicycles as desired.

The bicycle stand of the present invention is adapted for easy storage and transportation by loosening the tension member nuts 54 and rotating one module 20 about the common axis 34 with respect to the other module, thereby bringing the respective base tubes 22 into proximity and creating a substantially flat configuration. This configuration can then be stacked, transported, and stored conveniently.

Figure 5:
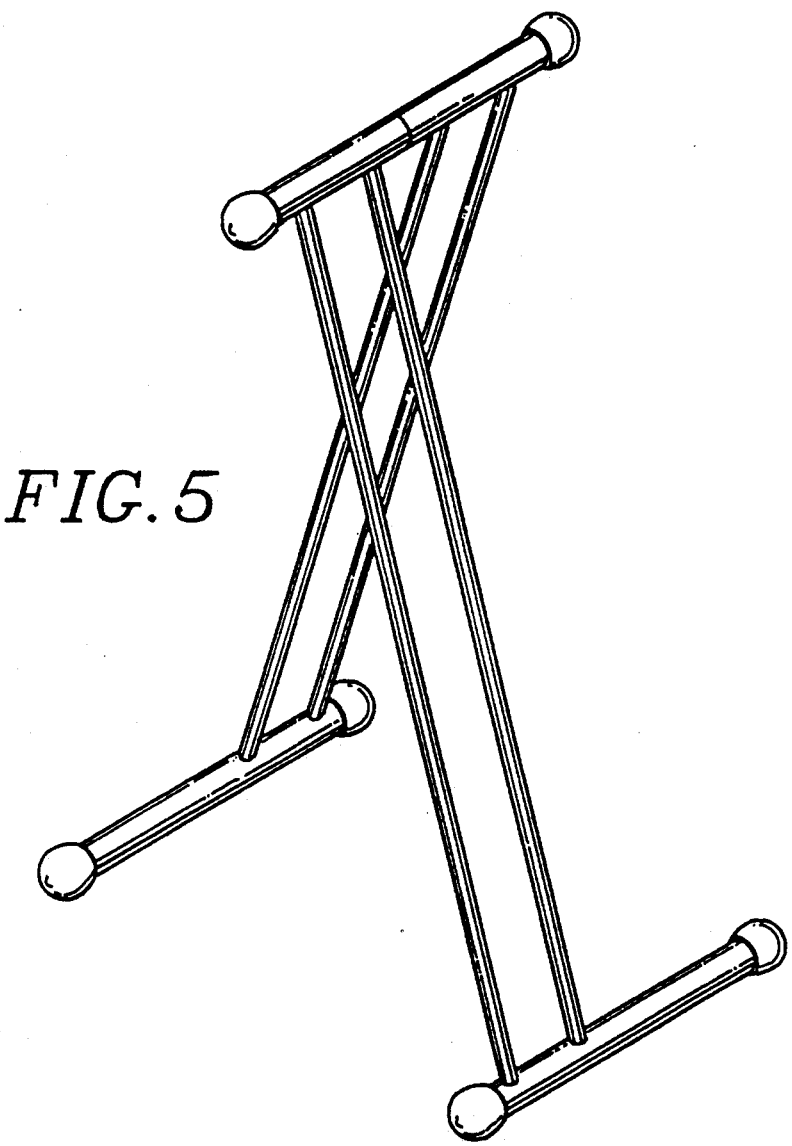
FIG. 5 is a perspective view of an alternative embodiment of the bicycle stand of the present invention.

It is important to note that the individual modules may contain as many or as few wheel receptacles as desired by the manufacturer. FIG. 5 shows an alternative embodiment of two modules having only one wheel receptacle per module.

It is also important to note that a different joining means for connecting two modules together may be used without departing from the invention, such as interlocking tube segments in a manner wherein the end of one tube segment is matingly compatible with the end of another tube segment. Additional alternative joining means include tenon and ferrule connections, individual nut and bolt connections, and slide clips.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A freestanding bicycle stand for supporting at least a pair of bicycles upright, comprising:
   (a) at least two substantially identical modules, each module having at least one wheel receptacle;
   (b) pivot means for connecting said modules together such that one module may rotate with respect to the other about an axis defined by said pivot means; and
   (c) clamp means, associated with said pivot means, that can be tightened for arresting rotation of one module with respect to the other.

2. A freestanding bicycle stand, comprising:
   (a) a module having tubes that define at least one wheel receptacle;
   (b) a pivot joint for joining at least two said modules such that one module may rotate with respect to the other module about an axis defined by said pivot joint and wherein the respective wheel receptacles are oriented to support a bicycle wheel upright; and
   (c) clamp means for tightening said joints so as to arrest rotation of one module with respect to the other.

3. A freestanding bicycle stand, comprising:
   (a) a module having at least one elongate, rectangular wheel receptacle defined by four tubular members arranged as the sides of a parallelogram; and
   (b) means for joining at least two said modules whereby the respective wheel receptacles are oriented to support a bicycle wheel upright.

4. A freestanding bicycle stand comprising:
   (a) an elongate base tube;
   (b) a pair of elongate wheel receptacles connected to said base tube, each adapted to receive a wheel of a bicycle therein for supporting said bicycle upright thereby, each said wheel receptacle comprising
   (b1) at least one pair of posts, having proximal ends fixedly connected to and extending outwardly from said base tube, and spacedly-arranged asymmetrically with respect to the ends of said base tube; and
   (b2) a tube segment fixedly connected to a distal end of one said pair of posts such that the base tube, posts, and tube segment define said wheel receptacle; and
   (c) means for joining said tube segment of one said wheel receptacle with the corresponding tube segment of said other wheel receptacle.

5. The stand of claim 4 wherein said joining means is an elongate tension member, threaded at its ends and inserted through said respective tube segments, and further including matingly compatible members threaded onto said tension member at each end thereof.

6. The stand of claim 4 wherein said pair of wheel receptacles are joined in a mirror image orientation.

7. The stand of claim 4 wherein said joining means connects a plurality of tube segments of respective wheel receptacles.

8. The stand of claim 4 wherein the length of the tube segments is substantially equal to the length of said base tube divided by twice the number of said pairs of posts.

9. A freestanding bicycle stand comprising:
   (a) a first base tube;
   (b) a second base tube spaced apart from and parallel to said first base tube;
   (c) an apex tube member comprised of a plurality of elongate tube segments arranged in series end to end; and
   (d) a pair of substantially parallel posts interconnected between one said tube segment and one of said base tubes to form a wheel receptacle means for supporting a bicycle wheel upright therein, said posts either connected to a first sequence of said tube segments and interconnected to said first base tube or connected to a second sequence of said tube segments and interconnected to said second base tube.

10. The stand of claim 9 wherein said first sequence is comprised of alternate ones of said tube segments and said second sequence is comprised of the remaining tube segments.

* * * * *